United States Patent
Yeh et al.

(10) Patent No.: US 9,207,501 B2
(45) Date of Patent: Dec. 8, 2015

(54) ELECTROPHORETIC DISPLAY PANEL AND MANUFACTURING METHOD THEREOF

(71) Applicant: E Ink Holdings Inc., Hsinchu (TW)

(72) Inventors: Hsu-Cheng Yeh, Hsinchu (TW); Ming-Chuan Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/454,716

(22) Filed: Aug. 7, 2014

(65) Prior Publication Data
US 2014/0347717 A1    Nov. 27, 2014

Related U.S. Application Data

(62) Division of application No. 13/466,145, filed on May 8, 2012.

(51) Int. Cl.
| | |
|---|---|
| G02B 26/00 | (2006.01) |
| G09G 3/19 | (2006.01) |
| G03G 13/00 | (2006.01) |
| G02F 1/133 | (2006.01) |
| G02F 1/1343 | (2006.01) |
| G02F 1/167 | (2006.01) |

(52) U.S. Cl.
CPC .......... *G02F 1/134309* (2013.01); *G02F 1/167* (2013.01); *G02F 2001/1676* (2013.01)

(58) Field of Classification Search
CPC ......... G02F 1/167; G02F 1/07; G02F 1/0316; G02F 1/163; G02F 1/1393; B82Y 20/00; G09G 3/16; G03G 13/22; G03G 17/04
USPC .......... 359/296, 245, 253–254; 345/105, 107, 345/49; 430/31–32; 349/33
See application file for complete search history.

(56) References Cited

U.S. PATENT DOCUMENTS

| | | | |
|---|---|---|---|
| 2004/0131779 A1* | 7/2004 | Haubrich et al. | 427/261 |
| 2006/0024957 A1* | 2/2006 | Harada et al. | 438/637 |
| 2007/0091418 A1* | 4/2007 | Danner et al. | 359/296 |
| 2007/0296899 A1* | 12/2007 | Murade | 349/139 |
| 2012/0262642 A1* | 10/2012 | Ikeda et al. | 349/46 |

FOREIGN PATENT DOCUMENTS

| | | |
|---|---|---|
| TW | 538268 | 6/2003 |
| TW | 201037663 | 10/2010 |

* cited by examiner

*Primary Examiner* — Dawayne A Pinkney
(74) *Attorney, Agent, or Firm* — Jiang Chyun IP Office

(57) ABSTRACT

An electrophoretic display panel includes a driving substrate and an electrophoretic display substrate. The driving substrate includes a first base material, driving electrode patterns, conductive lines, and a shielding layer. The first base material has a first configuration region and a second configuration region. The driving electrode patterns are located inside the first configuration region. The conductive lines are respectively connected to the driving electrode patterns and respectively extend from the first configuration region to the second configuration region. The shielding layer shields the conductive lines and exposes the driving electrode patterns. The electrophoretic display substrate includes a second base material located opposite to the first base material, an electrode layer, and display media. The electrode layer is disposed on the second base material and between the first and second base materials. The display media are disposed between the electrode layer and the driving electrode patterns.

9 Claims, 10 Drawing Sheets

ELECTROPHORETIC DISPLAY PANEL AND MANUFACTURING METHOD THEREOF

CROSS-REFERENCE TO RELATED APPLICATION

This application is a divisional of an application Ser. No. 13/466,145 filed on May 8, 2012, now pending, which claims the priority benefit of Taiwan application serial no. 101108148, filed on Mar. 9, 2012. The entirety of the above-mentioned patent application is hereby incorporated by reference herein and made a part of specification.

BACKGROUND OF THE INVENTION

1. Field of the Invention

The invention relates to a display panel and a manufacturing method thereof, and more particularly to an electrophoretic display panel and a manufacturing method thereof.

2. Description of Related Art

With the widespread use of information products and development of science and technology, manufacturers continuously aim at characterizing displays by light weight, compactness, and flexibility. Among the displays, an electrophoretic display has attracted great attention.

A normal electrophoretic display panel includes a driving substrate and an electrophoretic display substrate. The electrophoretic display substrate has an electrophoretic display material that includes a display solution and a plurality of display particles distributed into the display solution. When the driving substrate drives the display particles, the display particles are moved in an upward direction (i.e., approaching a user) or in a downward direction (moving away from the user). After the display particles reflect an external light source, the user is able to observe the display particles or the color of the display solution, so as to watch a corresponding display image. Nonetheless, numerous conductive lines are configured on the driving substrate, and the line width of the conductive lines is visible to human eyes, thus posing a negative impact on the resolution of the electrophoretic display panel.

SUMMARY OF THE INVENTION

The invention is directed to an electrophoretic display panel which has a shielding layer capable of shielding conductive lines, and the electrophoretic display panel features favorable resolution.

The invention is further directed to a manufacturing method of an electrophoretic display panel for forming the aforesaid electrophoretic display panel.

In the invention, an electrophoretic display panel that includes a driving substrate and an electrophoretic display substrate is provided. The driving substrate includes a first base material, a plurality of driving electrode patterns, a plurality of conductive lines, and a shielding layer. The first base material has a first configuration region and a second configuration region surrounding the first configuration region. The driving electrode patterns are disposed on the first base material and located in the first configuration region. The conductive lines are disposed on the first base material. Here, the conductive lines are respectively connected to the driving electrode patterns and respectively extend from the first configuration region to the second configuration region. The shielding layer is disposed on the first base material. Here, the shielding layer shields the conductive lines and exposes the driving electrode patterns. The electrophoretic display substrate is disposed above the driving substrate. Besides, the electrophoretic display substrate includes a second base material, an electrode layer, and a plurality of display media. The second base material is located opposite to the first base material. The electrode layer is disposed on the second base material and located between the first and second base materials. The display media are disposed between the electrode layer and the driving electrode patterns.

According to an embodiment of the invention, a material of the shielding layer includes a photoresist material or an insulating material.

According to an embodiment of the invention, the shielding layer has a plurality of openings. Each of the openings respectively exposes a portion of the conductive lines. The driving electrode patterns are located on the shielding layer and electrically connected to the portions of the conductive lines exposed by the openings through the openings.

According to an embodiment of the invention, each of the display media includes an electrophoretic liquid, a plurality of black charged particles, and a plurality of white charged particles, and the black charged particles and the white charged particles are distributed into the electrophoretic liquid.

According to an embodiment of the invention, the electrophoretic display panel further includes an adhesive layer disposed between the driving substrate and the electrophoretic display substrate, and the electrophoretic display substrate is fixed to the driving substrate through the adhesive layer.

In the invention, a manufacturing method of an electrophoretic display panel includes following steps. A first base material is provided. Here, the first base material has a first configuration region and a second configuration region surrounding the first configuration region. A plurality of driving electrode patterns are formed in the first configuration region, and a plurality of conductive lines extending from the first configuration region to the second configuration region are formed on the first base material. A photoresist layer is formed on the first base material. The photoresist layer covers the driving electrode patterns, the conductive lines, and a portion of the first base material. An exposure and development process is preformed on the photoresist layer to form a shielding layer shielding the conductive lines, and the first base material, the driving electrode patterns, the conductive lines, and the shielding layer together constitute a driving substrate. An electrophoretic display substrate is adhered onto the driving substrate, and the electrophoretic display substrate includes a second base material, an electrode layer, and a plurality of display media. The second base material is located opposite to the first base material. The electrode layer is disposed on the second base material and located between the first and second base materials. The display media are at least disposed between the electrode layer and the driving electrode patterns.

According to an embodiment of the invention, the step of forming the driving electrode patterns and the conductive lines includes the following. A conductive material layer is formed in the first configuration region and the second configuration region of the first base material. A first photoresist layer is formed on the conductive material layer, and the first photoresist layer covers the conductive material layer. A first exposure and development process is performed on the first photoresist layer to form a first patterned photoresist layer. A portion of the conductive material layer exposed by the first patterned photoresist layer is etched with use of the first patterned photoresist layer as an etching mask, so as to form the driving electrode patterns located in the first configuration region and the conductive lines respectively extending from the first configuration region to the second configuration region. The first patterned photoresist layer is removed to expose the driving electrode patterns, the conductive lines, and the portion of the first base material.

According to an embodiment of the invention, a material of the shielding layer includes a photoresist material.

According to an embodiment of the invention, the manufacturing method of the electrophoretic display panel further includes following steps. Before the photoresist layer is formed on the first base material, an insulating material layer is formed to cover the driving electrode patterns, the conductive lines, and the portion of the first base material. An exposure and development process is performed on the photoresist layer to form a patterned photoresist layer. A portion of the insulating material layer exposed by the patterned photoresist layer is etched with use of the patterned photoresist layer as an etching mask, so as to form the shielding layer. Before the electrophoretic display substrate is adhered onto the driving substrate, the patterned photoresist layer is removed.

According to an embodiment of the invention, a material of the shielding layer includes an insulating material.

According to an embodiment of the invention, a material of the photoresist layer includes positive-type photoresist or negative-type photoresist.

According to an embodiment of the invention, each of the display media includes an electrophoretic liquid, a plurality of black charged particles, and a plurality of white charged particles, and the black charged particles and the white charged particles are distributed into the electrophoretic liquid.

In the invention, a manufacturing method of an electrophoretic display panel includes following steps. A first base material having a first configuration region and a second configuration region surrounding the first configuration region is provided. A plurality of conductive lines extending from the first configuration region to the second configuration region is formed on the first base material. A shielding layer is formed on the first base material. Here, the shielding layer covers the first and second configuration regions of the first base material and has a plurality of openings. Each of the openings respectively exposes a portion of the conductive lines. A plurality of driving electrode patterns is formed on the shielding layer. Here, the driving electrode patterns are disposed in the first configuration region and respectively connected to the portion of the conductive lines exposed by the openings through the openings. The first base material, the driving electrode patterns, the conductive lines, and the shielding layer together constitute a driving substrate. An electrophoretic display substrate is adhered onto the driving substrate, and the electrophoretic display substrate includes a second base material, an electrode layer, and a plurality of display media. The second base material is disposed opposite to the first base material, the electrode layer is disposed on the second base material and located between the second base material and the first base material, and the display media is at least disposed between the electrode layer and the driving electrode patterns.

According to an embodiment of the invention, a method of aiming the shielding layer includes performing a photoresist coating process, an exposure and development process, and an etching process.

According to an embodiment of the invention, a method of forming the driving electrode patterns includes performing a photoresist coating process, an exposure and development process, and an etching process.

According to an embodiment of the invention, a method of forming the conductive lines includes performing a photoresist coating process, an exposure and development process, and an etching process.

According to an embodiment of the invention, each of the display media includes an electrophoretic liquid, a plurality of black charged particles, and a plurality of white charged particles, and the black charged particles and the white charged particles are distributed into the electrophoretic liquid.

Based on the above, the shielding layer in the electrophoretic display panel as described in the embodiments of the invention is formed by performing the exposure and development process, so as to effectively shield the conductive lines and prevent the conductive lines from being observed by human eyes. As such, the resolution of the electrophoretic display panel may be effectively ameliorated.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1A:
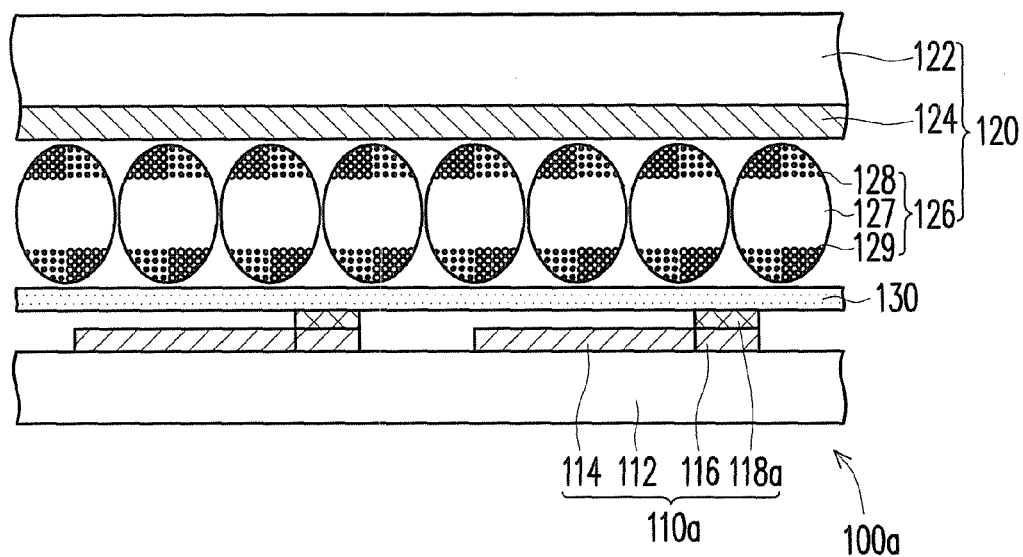
FIG. 1A is a schematic cross-sectional view illustrating an electrophoretic display panel according to an embodiment of the invention.
Figure 1B:
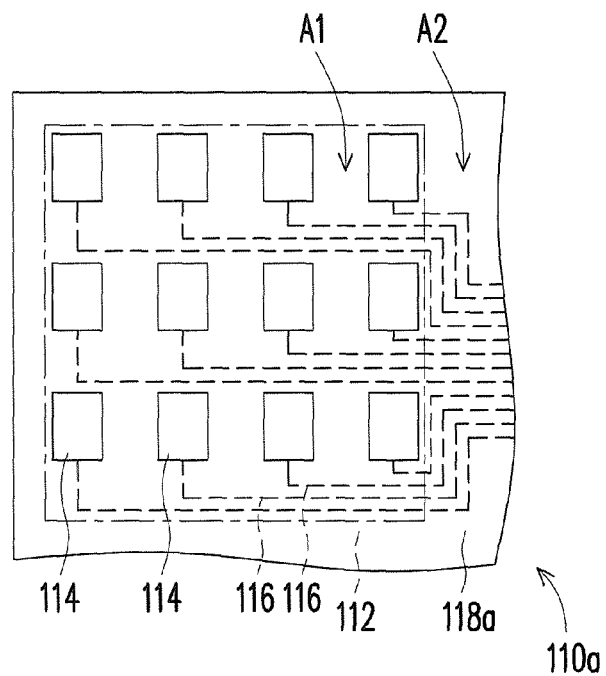
FIG. 1B is a schematic top view illustrating a driving substrate depicted in FIG. 1A.

FIG. 1A is a schematic cross-sectional view illustrating an electrophoretic display panel according to an embodiment of the invention. FIG. 1B is a schematic top view illustrating a driving substrate depicted in FIG. 1A. With reference to FIG. 1A and FIG. 1B, the electrophoretic display panel 100a in the present embodiment includes a driving substrate 110a and an electrophoretic display substrate 120.

To be more specific, the driving substrate 110a includes a first base material 112, a plurality of driving electrode patterns 114, a plurality of conductive lines 116, and a shielding layer 118a. The first base material 112 has a first configuration region A1 and a second configuration region A2 surrounding the first configuration region A1. The driving electrode patterns 114 are disposed on the first base material 112 and located in the first configuration region A1. The conductive lines 116 are disposed on the first base material 112 and respectively connected to the driving electrode patterns 114. Besides, the conductive lines 116 respectively extend from the first configuration region A1 to the second configuration region A2. The shielding layer 118a is disposed on the first base material 112. Here, the shielding layer 118a shields the conductive lines 116 and exposes the driving electrode patterns 114. Besides, the shielding layer 118a is made of a photoresist material or an insulating material, for instance.

The electrophoretic display substrate 120 is disposed above the driving substrate 110a. Here, the electrophoretic display substrate 120 includes a second base material 122, an electrode layer 124, and a plurality of display media 126. The second base material 122 is located opposite to the first base material 112. The electrode layer 124 is disposed on the second base material 122 and located between the first base material 112 and the second base material 112 and 122. The display media 126 are disposed between the electrode layer 124 and the driving electrode patterns 114. Here, the first configuration region A1 where the driving electrode patterns 114 are located may be considered a display region, and the second configuration region A2 where no driving electrode pattern 114 is located may be considered a non-display region. Each of the display media 126 includes an electrophoretic liquid 127, a plurality of black charged particles 128, and a plurality of white charged particles 129, and the black charged particles 128 and the white charged particles 129 are distributed into the electrophoretic liquid 127. According to the present embodiment, the electrophoretic display panel 100a further includes an adhesive layer 130 disposed between the driving substrate 110a and the electrophoretic display substrate 120, and the electrophoretic display substrate 120 is fixed to the driving substrate 110a through the adhesive layer 130.

Since the electrophoretic display panel 100a described in the present embodiment has the shielding layer 118a that shields the conductive lines 116, the conductive lines 116 are invisible to human eyes, and the resolution of the electrophoretic display panel 100a may be effectively ameliorated.

The structure of the electrophoretic display panel 100a is provided above, while the manufacturing process of the electrophoretic display panel 100a is not introduced yet. With reference to FIG. 2A to FIG. 2K, FIG. 3A to FIG. 3G, and FIG. 4A to FIG. 4D, the manufacturing process of electrophoretic display panels 100a, 100b, and 100c are respectively elaborated in the following three embodiments.

Figure 2A:
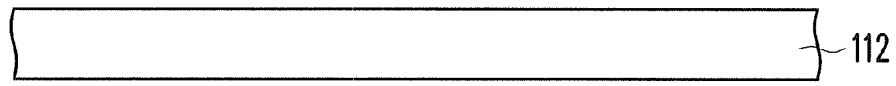
FIG. 2A through FIG. 2K are schematic views illustrating a manufacturing method of an electrophoretic display panel according to an embodiment of the invention.
Figure 2B:
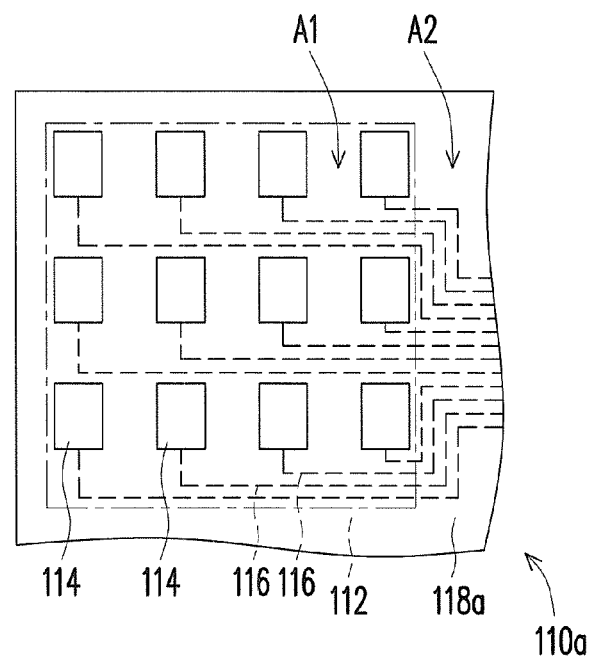

FIG. 2A through FIG. 2K are schematic views illustrating a manufacturing method of an electrophoretic display panel according to an embodiment of the invention. To facilitate description, FIG. 2B is a top view schematically illustrating the driving substrate, and FIG. 2A and FIG. 2C to FIG. 2K are cross-sectional views schematically illustrating the manufacturing method of the electrophoretic display panel. As shown in FIG. 2A and FIG. 2B, in the manufacturing method of the electrophoretic display panel 100a described in the present embodiment, a first base material 112 is provided. The first base material 112 has a first configuration region A1 and a second configuration region A2 surrounding the first configuration region A1.

Figure 2C:
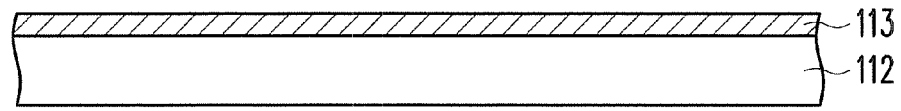

Next, with reference to FIG. 2B and FIG. 2C, a conductive material layer 113 is formed in the first configuration region A1 and the second configuration region A2, and the conductive material layer 113 covers the first base material 112. Here, the conductive material layer 113 is made of metal or a transparent conductive material, for instance.

Figure 2D:
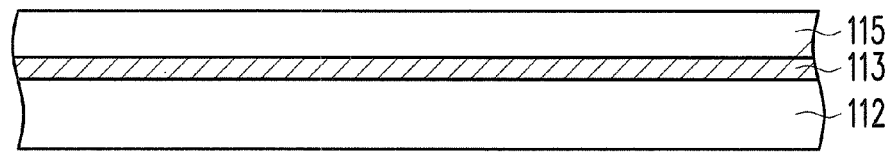

As shown in FIG. 2D, a first photoresist layer 115 is formed on the conductive material layer 113, and the first photoresist layer 115 covers the conductive material layer 113. The first photoresist layer 115 is made of negative-type photoresist.

Certainly, in another embodiment of the invention, the first photoresist layer 115 is likely to be made of positive-type photoresist.

Figure 2E:
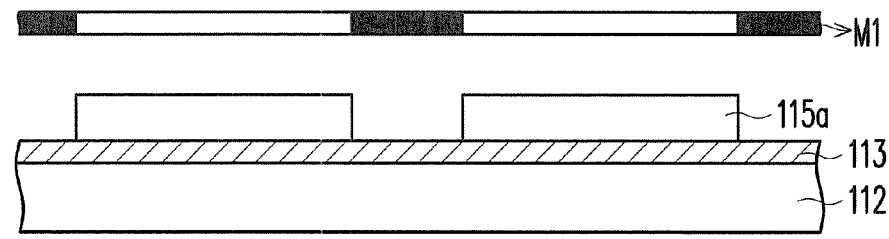

With reference to FIG. 2E, a first exposure and development process is performed on the first photoresist layer 115 with use of a photomask M1, so as to form a first patterned photoresist layer 115a.

Figure 2F:
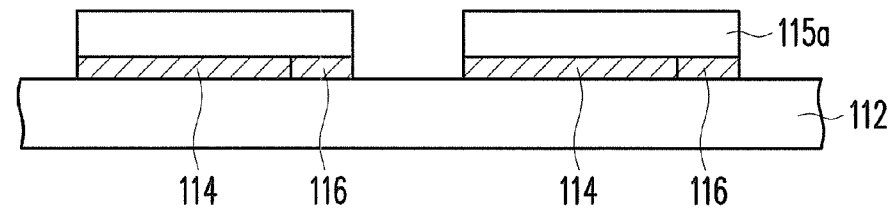

After that, as indicated in FIG. 2B, FIG. 2E, and FIG. 2F, a portion of the conductive material layer 113 exposed by the first patterned photoresist layer 115a is etched with use of the first patterned photoresist layer 115a as an etching mask, so as to form the driving electrode patterns 114 and the conductive lines 116. Here, the driving electrode patterns 114 are located in the first configuration region A1, and the conductive lines 116 are respectively connected to the driving electrode patterns 114 and respectively extend from the first configuration region A1 to the second configuration region A2.

Figure 2G:
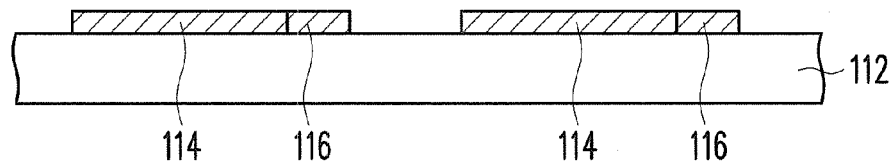

As indicated in FIG. 2G, the first patterned photoresist layer 115a is removed to expose the driving electrode patterns 114, the conductive lines 116, and the portion of the first base material 112.

Figure 2H:
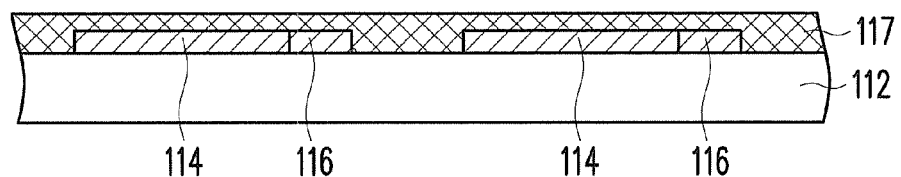

As shown in FIG. 2H, a second photoresist layer 117 is formed on the first base material 112, and the second photoresist layer 117 covers the driving electrode patterns 114, the conductive lines 116, and the portion of the first base material 112. The second photoresist layer 117 is made of positive-type photoresist. Certainly, in another embodiment of the invention, the second photoresist layer 117 is likely to be made of negative-type photoresist.

Figure 2I:
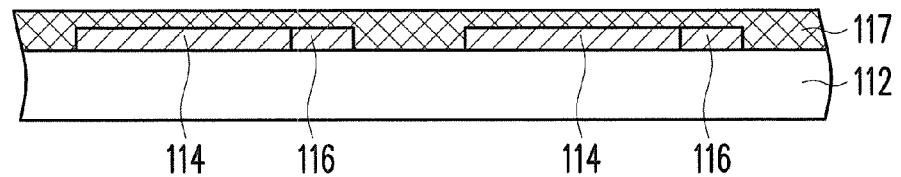
Figure 2J:
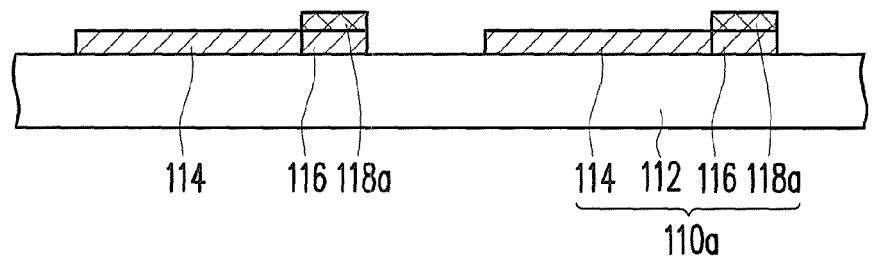

With reference to FIG. 2I and FIG. 2J, a second exposure and development process is performed on the second photoresist layer 117 with use of a photomask M2, so as to form a shielding layer 118a that shields the conductive lines 116. Here, the shielding layer 118a shields the conductive lines 116 and exposes the driving electrode patterns 114. The shielding layer 118a is made of a photoresist material. Namely, the shielding layer 118a is the patterned second photoresist layer 117. The first base material 112, the driving electrode patterns 114, the conductive lines 116, and the shielding layer 118a together constitute a driving substrate 110a.

Figure 2K:
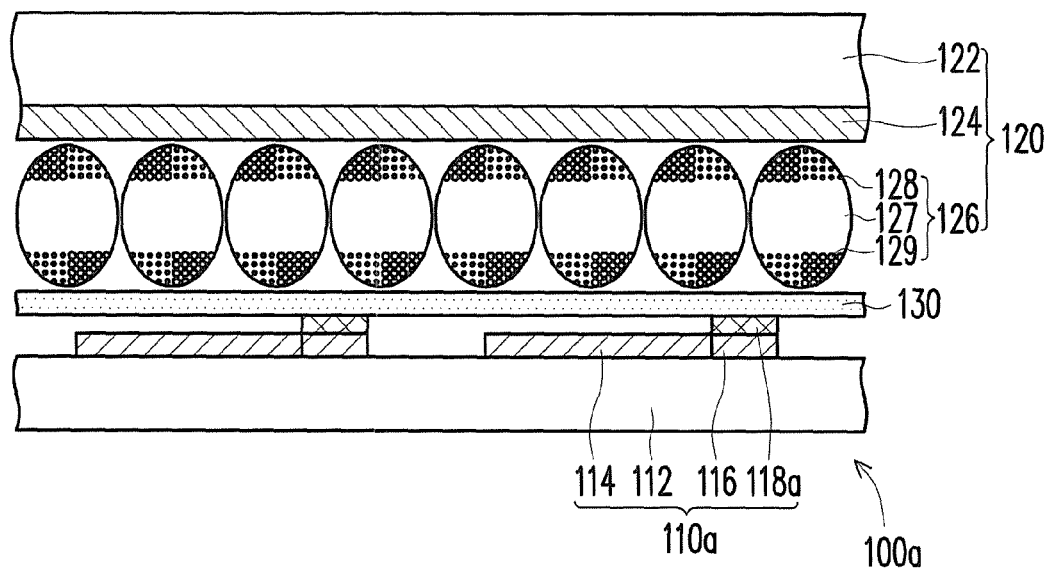

Finally, as indicated in FIG. 2K, an electrophoretic display substrate 120 is adhered to the driving substrate 110a through an adhesive layer 130. Here, the electrophoretic display substrate 120 includes a second base material 122, an electrode layer 124, and a plurality of display media 126. The second base material 122 is located opposite to the first base material 112. The electrode layer 124 is disposed on the second base material 122 and located between the first base material 112 and the second base material 122. The display media 126 are at least disposed between the electrode layer 124 and the driving electrode patterns 114. Each of the display media 126 includes an electrophoretic liquid 127, a plurality of black charged particles 128, and a plurality of white charged particles 129, and the black charged particles 128 and the white charged particles 129 are distributed into the electrophoretic liquid 127. So far, the electrophoretic display panel 100a is completely formed.

Since the driving electrode patterns 114 and the conductive lines 116 in the electrophoretic display panel 100a of the present embodiment are formed by performing a first photoresist coating process (i.e., forming the first photoresist layer 115), an exposure and development process, and an etching process, the line width of the conductive lines 116 may be effectively reduced. A second photoresist coating process (i.e., forming the second photoresist layer 117) and another exposure and development process are then performed to form the shielding layer 118a that shields the conductive lines 116. Thereby, the conductive lines 116 may be effectively shielded by the shielding layer 118a and are not visible to human eyes. Moreover, the resolution of the electrophoretic display panel 100a may be enhanced.

Same reference numbers representing the same or similar components described in the previous embodiment are applied in the following embodiments, and repetitive explanation in the previous embodiment and in the following embodiment is omitted. For a detailed description of this section, reference can be found in the previous embodiment of the invention, and therefore no further description is provided herein.

Figure 3A:
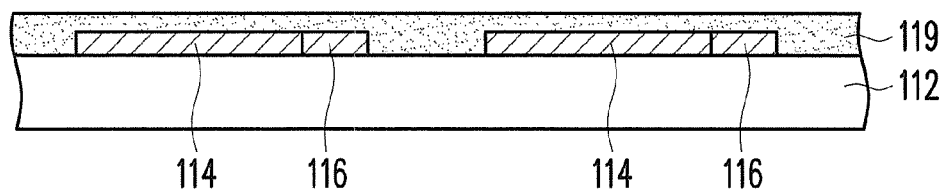
FIG. 3A through FIG. 3G are cross-sectional views illustrating a manufacturing method of an electrophoretic display panel according to another embodiment of the invention.
Figure 3B:
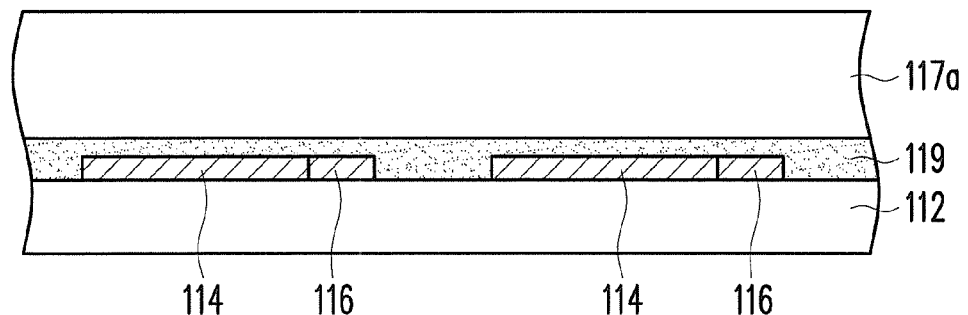
Figure 3C:
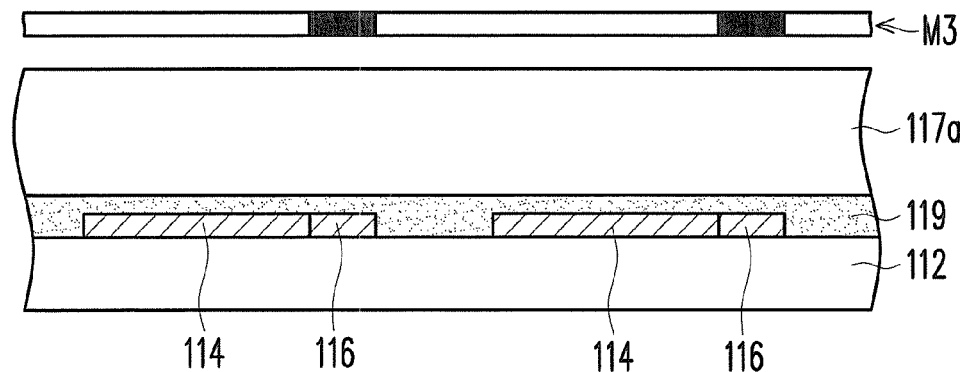
Figure 3D:
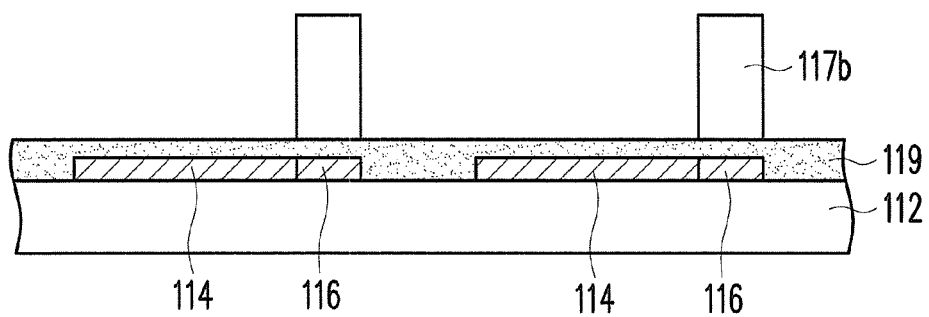
Figure 3E:
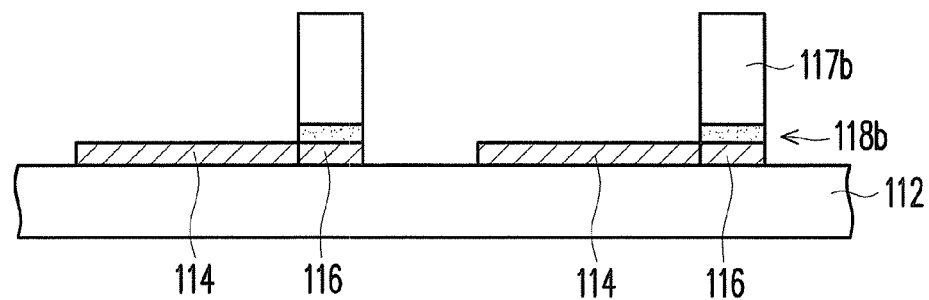
Figure 3F:
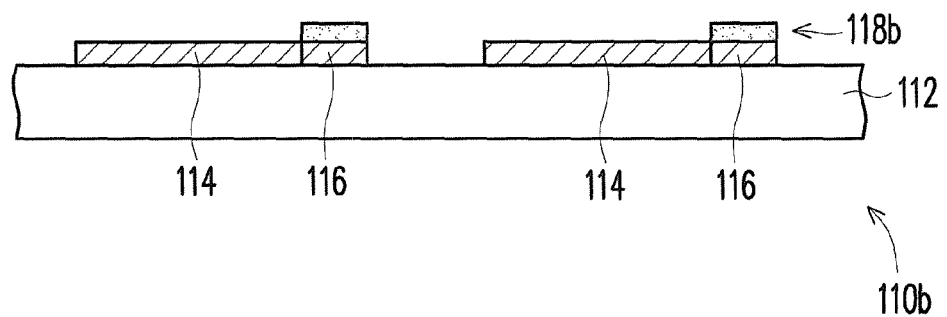
Figure 3G:
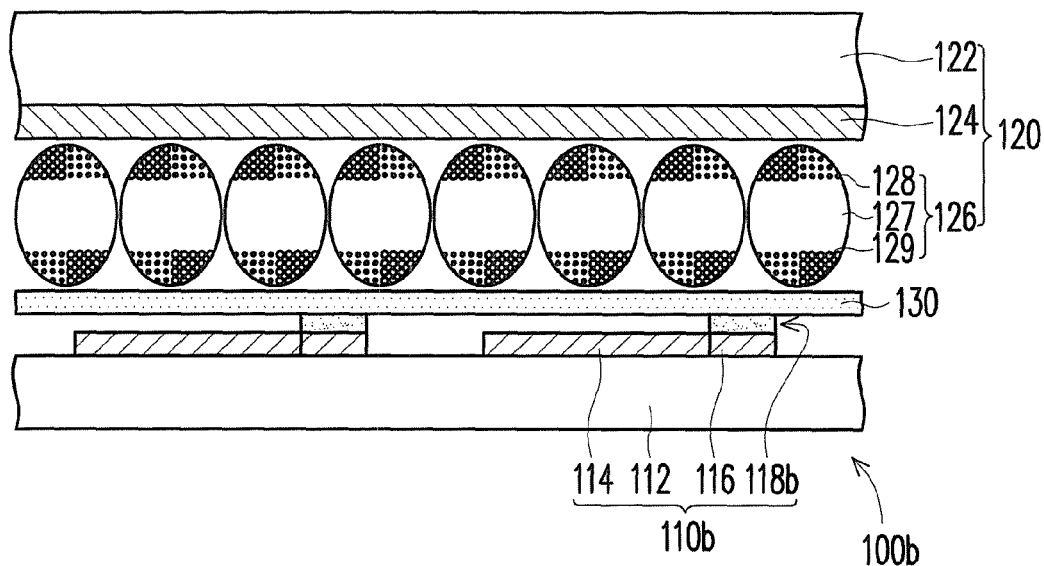

FIG. 3A through FIG. 3G are cross-sectional views illustrating a manufacturing method of an electrophoretic display panel according to another embodiment of the invention. With reference to FIG. 3G, the electrophoretic display panel 100b of the present embodiment is similar to the electrophoretic display panel 100a depicted in FIG. 1A. The main difference lies in that the material of the shielding layer 118b in the present embodiment is different from the material of the shielding layer 118a in the previous embodiment.

As to the fabrication, the electrophoretic display panel 100b of the present embodiment may be formed by performing the steps of forming the electrophoretic display panel 100a of the previous embodiment. Besides, after the step shown in FIG. 2G is carried out, the first patterned photoresist layer 115a is removed, so as to expose the driving electrode patterns 114, the conductive lines 116, and the portion of the first base material 112. As indicated in FIG. 3A, an insulating material layer 119 is formed to cover the driving electrode patterns 114, the conductive lines 116, and the portion of the first base material 112.

As shown in FIG. 3B, a second photoresist layer 117a is formed on the first substrate 112, and the second photoresist layer 117a covers the insulating material layer 119. The second photoresist layer 117a is made of positive-type photoresist. Certainly, in another embodiment of the invention, the second photoresist layer 117a is likely to be made of negative-type photoresist.

With reference to FIG. 3C and FIG. 3D, a second photolithography process is performed on the second photoresist layer 117a with use of a photomask M3, so as to form a second patterned photoresist layer 117b.

With reference to FIG. 3D and FIG. 3E, a portion of the insulating material layer 119 exposed by the second patterned photoresist layer 117b is etched with use of the second patterned photoresist layer 117b as an etching mask, so as to form a shielding layer 118b. The shielding layer 118b is made of an insulating material. Namely, the shielding layer 118b is the patterned insulating material layer 119.

As indicated in FIG. 3F, the second patterned photoresist layer 117b is removed to expose the driving electrode patterns 114, the conductive lines 116, the shielding layer 118b, and the portion of the first base material 112. Here, the first base material 112, the driving electrode patterns 114, the conductive lines 116, and the shielding layer 118b together constitute a driving substrate 110b. The shielding layer 118b shields the conductive lines 116 and exposes the driving electrode patterns 114.

Finally, as indicated in FIG. 3G, an electrophoretic display substrate 120 is adhered to the driving substrate 110b through an adhesive layer 130. Here, the electrophoretic display substrate 120 includes a second base material 122, an electrode layer 124, and a plurality of display media 126. The second base material 122 is located opposite to the first base material 112. The electrode layer 124 is disposed on the second base material 122 and located between the first base materials 112 and the second base materials 122. The display media 126 are at least disposed between the electrode layer 124 and the driving electrode patterns 114. Each of the display media 126 includes an electrophoretic liquid 127, a plurality of black charged particles 128, and a plurality of white charged particles 129, and the black charged particles 128 and the white charged particles 129 are distributed into the electrophoretic liquid 127. So far, the electrophoretic display panel 100b is completely formed.

Figure 4A:
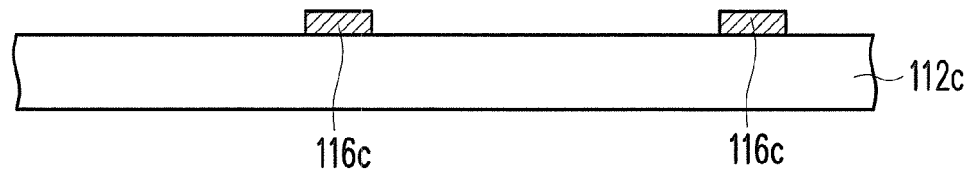
FIG. 4A through FIG. 4D are cross-sectional views illustrating a manufacturing method of an electrophoretic display panel according to still another embodiment of the invention.
Figure 4B:
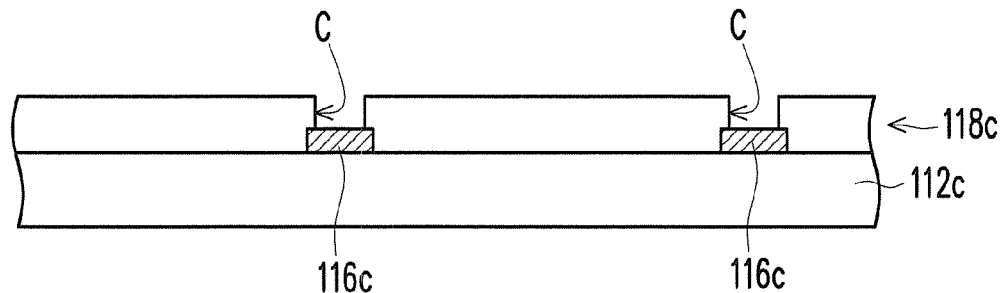
Figure 4C:
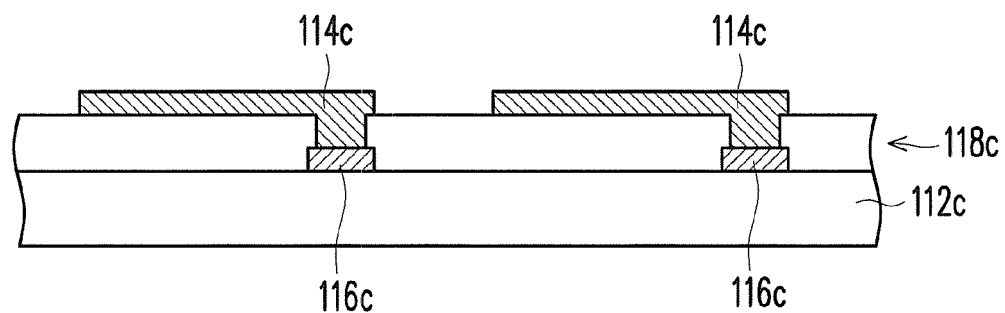
Figure 4D:
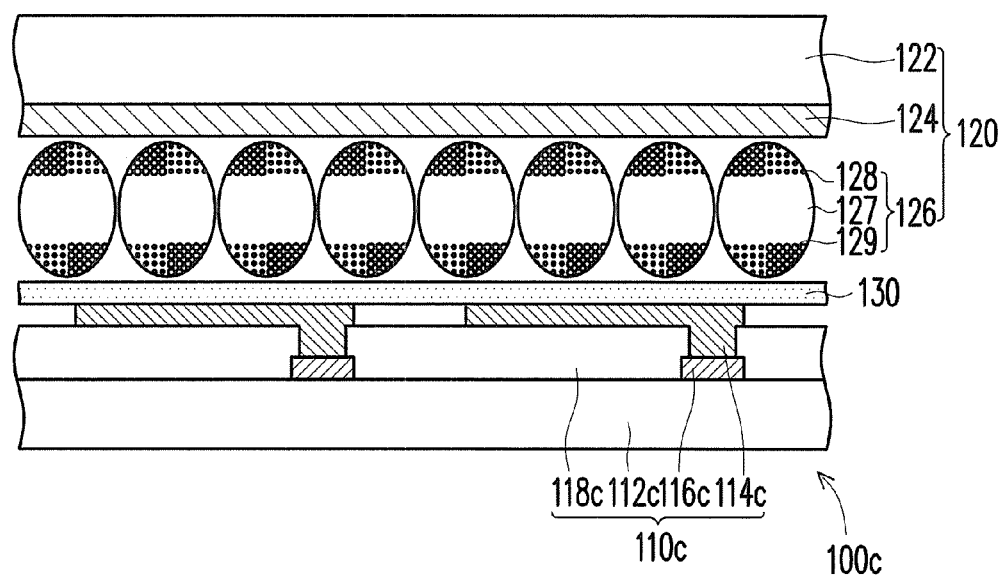

FIG. 4A through FIG. 4D are cross-sectional views illustrating a manufacturing method of an electrophoretic display panel according to still another embodiment of the invention. With reference to FIG. 4D, the electrophoretic display panel 100c of the present embodiment is similar to the electrophoretic display panel 100a depicted in FIG. 1A. The main difference lies in that the material of the shielding layer 118c in the present embodiment is different from the material of the shielding layer 118a in the previous embodiment, and that the arrangement of the driving electrode patterns 114c, the conductive lines 116c, and the shielding layer 118c is different from the arrangement of the driving electrode patterns 114, the conductive lines 116, and the shielding layer 118a.

With reference to FIG. 4A, as to fabrication of the electrophoretic display panel 100c, a first base material 112c is provided, and the first base material 112c has a plurality of conductive lines 116c formed thereon. Here, the conductive lines 116c, for instance, are formed by performing a photoresist coating process, an exposure and development process, and an etching process, and the steps of forming the conductive lines 116c are similar to the steps of forming the driving electrode patterns 114 and the conductive lines 116 shown in FIG. 2A to FIG. 2G. Therefore, no further description is provided hereinafter. In addition, the location where the conductive lines 116c are configured is the same as the location where the conductive lines 116 are configured, i.e., the conductive lines 116c also extend from the first configuration region A1 (shown in FIG. 2B) to the second configuration region A2 (shown in FIG. 2B).

Thereafter, with reference to FIG. 4B, a shielding layer 118c is formed on the conductive lines 116c and the first base material 112c, and the shielding layer 118c shields the conductive lines 116c and has a plurality of openings C. Each of the openings C respectively exposes a portion of the conductive lines 116c. Here, the shielding layer 118c, for instance, is formed by performing a photoresist coating process, an exposure and development process, and an etching process, and the steps of forming the shielding layer 118c are similar to the steps of forming the driving electrode patterns 114, the conductive lines 116, or the shielding layer 118b shown in FIG. 3A to FIG. 3F. Therefore, no further description is provided hereinafter.

As indicated in FIG. 4C, a plurality of driving electrode patterns 114c are formed on the shielding layer 118c. Here, the driving electrode patterns 114c are respectively connected to the portion of the conductive lines 116c respectively exposed by the openings C through the openings C. Here, the shielding layer 118c shields the conductive lines 116c and exposes the driving electrode patterns 114c. The driving electrode patterns 114c, for instance, are formed by performing a photoresist coating process, an exposure and development process, and an etching process, and the steps of forming the driving electrode patterns 114c are similar to the steps of forming the driving electrode patterns 114 and the conductive lines 116 shown in FIG. 2A to FIG. 2G. Therefore, no further description is provided hereinafter. In addition, the location where the driving electrode patterns 114c are configured is the same as the location where the driving electrode patterns 114 are configured, i.e., the driving electrode patterns 114c are also disposed in the first configuration region A1 (shown in FIG. 2B). The first base material 112c, the driving electrode patterns 114c, the conductive lines 116c, and the shielding layer 118c together constitute a driving substrate 110c.

Finally, as indicated in FIG. 4D, an electrophoretic display substrate 120 is adhered to the driving substrate 110c through an adhesive layer 130. Here, the electrophoretic display substrate 120 includes a second base material 122, an electrode layer 124, and a plurality of display media 126. The second base material 122 is located opposite to the first base material 112c. The electrode layer 124 is disposed on the second base material 122 and located between the first base material 112c and the second base material 122. The display media 126 are at least disposed between the electrode layer 124 and the driving electrode patterns 114c. Each of the display media 126 includes an electrophoretic liquid 127, a plurality of black charged particles 128, and a plurality of white charged particles 129, and the black charged particles 128 and the white charged particles 129 are distributed into the electrophoretic liquid 127. So far, the electrophoretic display panel 100c is completely formed.

In light of the foregoing, the driving electrode patterns and the conductive lines in the electrophoretic display panel described in the embodiments of the invention are formed by performing a photoresist coating process (i.e., forming the first photoresist layer), an exposure and development process, and an etching process, and thus the line width of the conductive lines may be effectively reduced. A second photoresist coating process (i.e., forming the second photoresist layer) and another exposure and development process are then performed to form the shielding layer that shields the conductive lines. Thereby, the conductive lines may be effectively shielded by the shielding layer and are not visible to human eyes. Moreover, the resolution of the electrophoretic display panel may be enhanced.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An electrophoretic display panel comprising:
   a driving substrate comprising:
   a first base material having a first configuration region and a second configuration region surrounding the first configuration region;
   a plurality of driving electrode patterns disposed on the first base material and located in the first configuration region;
   a plurality of conductive lines disposed on the first base material, the conductive lines being respectively connected to the driving electrode patterns and respectively extending from the first configuration region to the second configuration region, wherein orthogonal projections of the driving electrode patterns on a thickness of the first base material parallel with a plane in which the first base material lies are respectively completely overlapped with orthogonal projections of the conductive lines, and orthogonal projection area of the driving electrode patterns on a thickness of the first base material parallel with a plane in which the first base material lies are respectively greater than that of the conductive lines; and
   a shielding layer disposed on the first base material and exposing the driving electrode patterns, wherein the shielding layer has a plurality of openings, each of the openings respectively exposes a portion of the conductive lines, and the driving electrode patterns are located on the shielding layer and electrically connected to the portions of the conductive lines exposed by the openings through the openings, the shielding layer and the driving electrode patterns shield the conductive lines to prevent the conductive lines from being observed by human eyes; and
   an electrophoretic display substrate disposed above the driving substrate, the electrophoretic display substrate comprising:
   a second base material located opposite to the first base material;
   an electrode layer disposed on the second base material and located between the first base material and the second base material; and
   a plurality of display media disposed between the electrode layer and the driving electrode patterns.

2. The electrophoretic display panel as recited in claim 1, wherein a material of the shielding layer comprises a photoresist material or an insulating material.

3. The electrophoretic display panel as recited in claim 1, wherein each of the display media comprises an electrophoretic liquid, a plurality of black charged particles, and a plurality of white charged particles, and the black charged particles and the white charged particles are distributed into the electrophoretic liquid.

4. The electrophoretic display panel as recited in claim 1, further comprising:
   an adhesive layer disposed between the driving substrate and the electrophoretic display substrate, wherein the electrophoretic display substrate is fixed to the driving substrate through the adhesive layer.

5. A manufacturing method of an electrophoretic display panel, the manufacturing method comprising:
   providing a first base material, the first base material having a first configuration region and a second configuration region surrounding the first configuration region, wherein a plurality of conductive lines extending from the first configuration region to the second configuration region are formed on the first base material;
   forming a shielding layer on the first base material, wherein the shielding layer covers the first and second configuration regions of the first base material, the shielding layer has a plurality of openings, and each of the openings respectively exposes a portion of the conductive lines;
   forming a plurality of driving electrode patterns on the shielding layer, wherein the driving electrode patterns are disposed in the first configuration region and respectively connected to the portion of the conductive lines exposed by the openings through the openings, orthogonal projections of the driving electrode patterns on a thickness of the first base material parallel with a plane in which the first base material lies are respectively overlapped with orthogonal projections of the conductive lines, orthogonal projection area of the driving electrode patterns on a thickness of the first base material parallel with a plane in which the first base material lies are respectively greater than that of the conductive lines, and the first base material, the driving electrode patterns, the conductive lines, and the shielding layer together constitute a driving substrate, and the shielding layer and the driving electrode patterns shield the conductive lines to prevent the conductive lines from being observed by human eyes; and adhering an electrophoretic display substrate onto the driving substrate, the electrophoretic display substrate comprising a second base material, an electrode layer, and a plurality of display media, the second base material being located opposite to the first base material, the electrode layer being disposed on the second base material and located between the second base material and the first base material, the display media being at least disposed between the electrode layer and the driving electrode patterns.

6. The manufacturing method of the electrophoretic display panel as recited in claim 5, wherein a method of forming the shielding layer comprises performing a photoresist coating process, an exposure and development process, and an etching process.

7. The manufacturing method of the electrophoretic display panel as recited in claim 5, wherein a method of forming the driving electrode patterns comprises performing a photoresist coating process, an exposure and development process, and an etching process.

8. The manufacturing method of the electrophoretic display panel as recited in claim 5, wherein a method of forming the conductive lines comprises performing a photoresist coating process, an exposure and development process, and an etching process.

9. The manufacturing method of the electrophoretic display panel as recited in claim 5, wherein each of the display media comprises an electrophoretic liquid, a plurality of black charged particles, and a plurality of white charged particles, and the black charged particles and the white charged particles are distributed into the electrophoretic liquid.

* * * * *